Patented Dec. 26, 1944

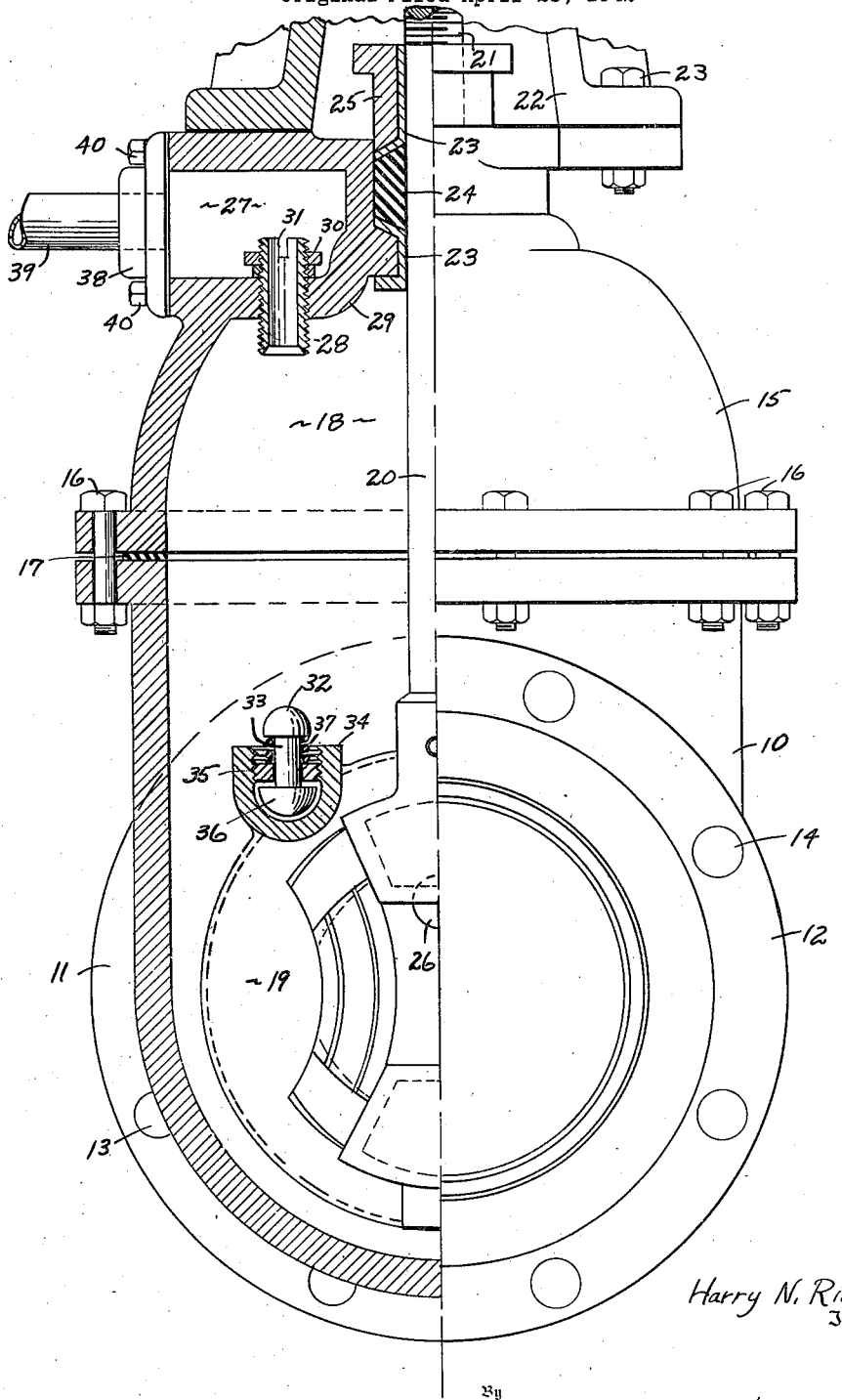

2,365,907

UNITED STATES PATENT OFFICE 2,365,907

GATE VALVE WITH MONITOR

Harry N. Rider, Youngstown, Ohio, assignor to "Automatic" Sprinkler Company of America, Youngstown, Ohio, a corporation of Delaware Original application April 28, 1942, Serial No. 440,781. Divided and this application April 10, 1943, Serial No. 482,659

3 Claims. (Cl. 277—8)

This invention relates to gate valves and more particularly to a gate valve provided with a monitor valve.

The principal object of the invention is the provision of a gate valve provided with means for originating a fluid alarm at such times as the gates thereof are moved from a fully opened position.

A further object of the invention is the provision of a gate valve having a monitor valve incorporated therein in a manner so as to insure against tampering or any other act which might render the monitor valve inoperative.

A still further object of the invention is the provision of a gate valve having a monitor valve formed therein in a simple, easily constructed economical manner.

The gate valve with monitor, the subject of this invention, has been designed for use in connection with fluid supply lines which are commonly open; as for example, the supply line to a sprinkler system. In order that the fluid supply may be controlled when desired, gate valves are commonly employed between the fluid source and the wet or dry pipe valves of sprinkler systems. As sprinkler systems depend in operation upon the control of the fluid supply by the automatic wet or dry valves used, the gate valves employed in addition to such wet or dry valves must be normally open in order to insure the satisfactory operation of the sprinkler system in the event of a fire. Several devices have been provided for attachment to the exterior portions of outside stem and yoke gate valves so as to cause a signal to be given upon the closure of the same. As known in the art, these devices have consisted of attachments to the exterior portions of the gate valve and are therefore subject to tampering, wilful damage, or sabotage, to enable the gate valve to be closed and no signal given, thereby rendering the sprinkler system inoperative.

The present invention contemplates the provision of a gate valve with a monitor formed so as to render it inaccessible to tampering, wilful damage, or sabotage, as the operating portions thereof are formed in the interior of the body and bonnet portions of the gate valve.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

The figure is an end elevation, partially in cross-section, with parts broken away, and illustrating the major portions of an open stem and yoke gate valve with a monitor valve formed therein.

This is a division of my co-pending application for patent entitled Automatic deluge sprinkler system, Serial No. 440,781, filed April 28, 1942.

By referring to the drawing, a gate valve of approximately conventional design may be seen, the body of which is indicated by the numeral 10 and the supply and delivery end attachment flanges by the numerals 11 and 12 respectively. A plurality of openings 13 and 14 are formed in each of the end flanges 11 and 12 so that the gate valve may be positioned thereby in a fluid supply line. The valve body 10 has a bonnet 15 positioned thereon by means of a plurality of bolts 16, and a conventional gasket 17 is positioned between the valve body 10 and bonnet 15 so that a fluid tight joint is established. The bonnet 15 is formed so as to provide a chamber 18 therein, which in conjunction with the interior of the valve body 10 provides sufficient space for the gates of the valve, one of which is shown and indicated by the number 19, when they are moved into open position. In the drawing, the gate 19 is shown in closed position effectively blocking the normal fluid passageway through the gate valve. The operating stem which serves to open or close the gates 19 is indicated by the numeral 20 and it will be observed that the upper-most section thereof is threaded so that vertical movement may be imparted thereto by means of a hand wheel (not shown) mounted on the upper-most portion (not shown) of a yoke 22 which is positioned on the uppermost flanged surface of the bonnet 15 by means of a plurality of bolts 23. A tight closure is formed about the stem 20 where it passes into the interior of the bonnet 15. The closure consists of a pair of packing rings 23, a resilient packing ring 24, and a gland 25, which is adapted to be held in position by means of externally positioned bolts (not shown). The stem 20 provides the necessary vertical travel for the gates 19.

By referring to the gate 19 illustrated in the cross-sectional portion of the drawing, it will be observed that an opening 26 has been formed therein so that the fluid against the opposite surface of the gate 19 illustrated, may flow through the opening 26 and enter the space between the gates and thereby gain access to the interior of the valve body 10 and the chamber 18 in the bonnet 15. The opening 26 is positioned in the gate 19 adjacent the fluid supply source. The gate valve therefore relies on the other one of the gates 19 for completely blocking the flow of fluid therethrough when closed. In order that the fluid in the interior of the gate valve may be employed to initiate an alarm, the bonnet 15 of the valve is formed with a secondary chamber 27 therein which chamber is placed in communication with the chamber 18 in the bonnet 15 by means of a tubular fitting 28 positioned through the dividing partition 29 in a suitable manner and held in predetermined position by means of a lock nut assembly 30. A slot 31 in the upper-most end of the tubular fitting 28 provides a means of adjustment as the tubular fitting is threadably positioned in the opening in the partition 29. The lower-most end of the tubular fitting 28 is shaped so as to effectively receive and be closed by a relatively soft metal button 32, formed on a shaft 33 and positioned on the gate 19 by means of a cylindrical body 34 formed as an integral part thereof. The soft metal button 32 and its shaft 33 are positioned in a movable manner in the cylindrical body 34 by means of a threadably positioned partition 35 and a head 36 is positioned on the shaft 33 on the opposite side of the partition 35 with respect to the soft metal button 32. A tensioning spring 37 is positioned between the partition 35 and the soft metal button 32 so as to normally urge the soft metal button 32 outwardly from the cylindrical body 34. It will be seen that the soft metal button 32 is positioned on the gate 19 in direct alignment with the open end of the tubular fitting 28 extending into the chamber 18 in the bonnet 15 of the gate valve so that when the gates 19 are in a fully open position, the soft metal button 32 registers with and effectively closes the passageway between the chamber 18 and secondary chamber 27 defined by the tubular fitting 28. Thus, fluid normally confined within the interior of the valve body 10 and in the chamber 18 in the bonnet 15 when the gates 19 are in open position, is not permitted to flow into the secondary chamber 27. At such time, however, as any movement is imparted to the stem 20 so as to begin to close the gates 19, the soft metal button 32 will move away from the tubular fitting 28 so as to open the channel therethrough and thus permit fluid to flow therethrough into the secondary chamber 27 from whence it is directed to a water motor alarm or pressure actuated electrical circuit closer by means of a cap 38 and a pipe 39 threadably positioned in an opening therein. The cap 38 is affixed to the portion of the bonnet 15 forming the secondary chamber 27 by means of a plurality of bolts 40. It will thus be seen that a gate valve having a monitor valve formed therein has been designed wherein the structure of the gate valve itself has been modified so as to form the secondary chamber 27 in the bonnet portion thereof and the cylindrical body 37 on one of the gates thereof as well as the modification comprising the positioning of the opening 26 therein so as to permit the continued sounding of an alarm in the event the gate valve is fully closed. The gate valve so modified, forms a monitored gate valve wherein the actuating portions are entirely enclosed and therefore incapable of being tampered with, or wilfully damaged, so as to render them inoperative, and the gate valve with monitor when installed in connection with a fluid line such as that supplying a sprinkler system will immediately cause an alarm to be given when any attempt to close the valve is made. It will also be seen that the gate valve with monitor is relatively simple in construction, positive in operation, and capable of economical manufacture.

Having thus described my invention, what I claim is:

1. In a gate valve having a body and bonnet and gates movably positioned therein and adapted to control a main fluid passageway therethrough, a secondary valve adapted to control a secondary fluid passageway from the gate valve, said secondary valve comprising a valve element mounted on one of the said gates, a valve seat in said bonnet, an opening in said valve seat, the said valve element adapted to register with the said valve seat, the secondary valve being normally closed when the gate valve is open.

2. In a manually operated gate valve adapted to be positioned between a supply source and an automatic valve, a secondary fluid passageway therefrom, secondary valve means in said gate valve adapted to control the secondary fluid passageway, said secondary fluid passageway comprising a tubular fitting positioned through a wall of the said gate valve and a spring pressed closure member positioned on a gate of the said gate valve and adapted to register with, so as to close, the said tubular fitting at such time as the said gate valve is in full open position.

3. In a fluid valve comprising a structure having a fluid passageway therethrough and a movable closure for closing the said fluid passageway, a monitor valve in association therewith for controlling a secondary fluid passageway from the said fluid valve, the said monitor valve comprising a monitor valve element mounted on the said movable closure, and a tubular fitting positioned in the valve body and defining a passageway to the exterior thereof and adapted to be closed by the said monitor valve element when the said movable closure is in full-open position.

HARRY N. RIDER.